May 16, 1967 R. FISHER 3,319,691

NUT HOLDER FOR LINER PLATES AND THE LIKE

Filed March 8, 1965 2 Sheets-Sheet 1

INVENTOR
ROY FISHER
BY
ATTORNEYS

May 16, 1967   R. FISHER   3,319,691
NUT HOLDER FOR LINER PLATES AND THE LIKE
Filed March 8, 1965   2 Sheets-Sheet 2

INVENTOR
ROY FISHER
BY

ATTORNEYS

United States Patent Office 3,319,691
Patented May 16, 1967

3,319,691
NUT HOLDER FOR LINER PLATES
AND THE LIKE
Roy Fisher, Winnipeg, Manitoba, Canada, assignor to Christopher L. Fisher, St. Boniface, Manitoba, Canada
Filed Mar. 8, 1965, Ser. No. 437,807
6 Claims. (Cl. 151—41.74)

My invention relates to new and useful improvements in nut holders for liner plates and the like, particularly nut holders designed to hold a pair of nuts in position on the outer surfaces of liner plates so that they can be engaged by bolts passing through apertures formed in the liner plates.

The liner plates referred to in this specification are primarily corrugated sections of plate which are bolted together to form a tunnel liner.

Inasmuch as the liner plate, when in position, is relatively close to the earth or rock walls, it is difficult to position externally the nuts so that they can be engaged by the bolts which hold the adjacent sections together.

I provide a pair of nuts held within a frame which can be secured to the outer surfaces of the liner plates so that the nuts align with the holes within the liner plates whereupon the bolts can be inserted from the inside rapidly and easily.

The principal object and essence of the invention is therefore to provide a device of the character herewithin described which enables a pair of nuts to be positioned in alignment with pre-formed apertures in a pair of nesting liner plates so that the holding bolts can be inserted through the apertures and engage the nuts.

Another object of the invention is to provide a device of the character herewithin described in which the frame holding the nuts can be cast or, alternatively, it can be stamped from sheet metal.

Still another object of the invention is to provide a device of the character herewithin described in which the frame can be made of an alloy being higher in the electro-motive force series than the material used for the liner plates thus giving galvanic protection to the nuts, bolts and liner plates.

A still further object of the invention is to provide a device of the character herewithin described which is simple in construction, economical in manufacture and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described and reference being had to the accompanying drawings in which.

In the drawings like characters of reference indicate corresponding parts in the different figures.

Figure 1:
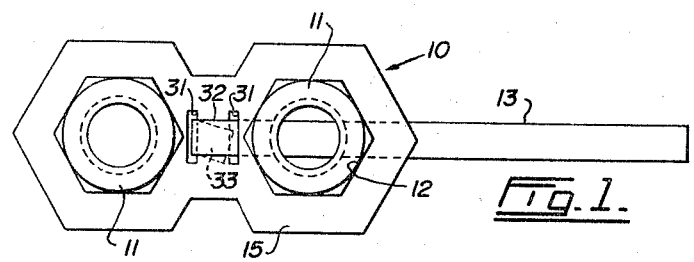
FIGURE 1 is a plan view of one embodiment of my device.
Figure 2:
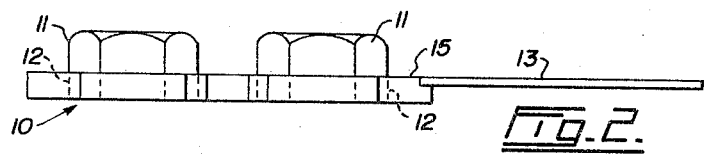
FIGURE 2 is a side elevation thereof.

Proceeding therefore to describe my invention in detail, reference should first be made to FIGURES 1 and 2 in which 10 illustrates collectively a frame adapted to hold a pair of nuts 11 in spaced relationship one from the other.

This frame is preferably cast from an aluminum alloy and the nuts 11 are placed within the mould and the frame cast therearound. This forms apertures 12 within which the nuts are held, the boundaries of the apertures taking the form of the outer perimetrical contour of the nuts 11.

As the metal cools, it contracts and holds the nuts firmly in position against displacement from the frame.

These frames can, of course, be spot welded into position upon the liner plates at the site, but I prefer to provide an extending tongue or strip 13 extending from one end 14 of the frame and substantially parallel to the longitudinal axis thereof. This strip 13 is preferably formed flush with the upper surface 15 of the frame as illustrated in FIGURE 2 and the purpose of this tongue will be explained later on in this specification.

Figure 3:
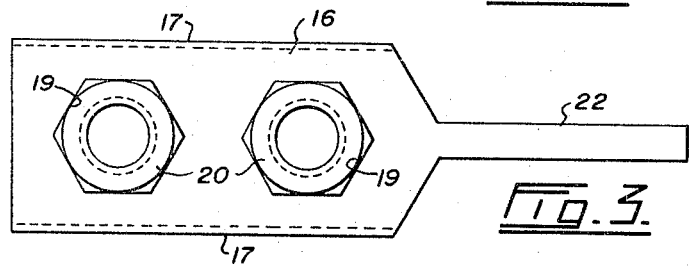
FIGURE 3 is a plan view of an alternative embodiment of my device.
Figure 4:
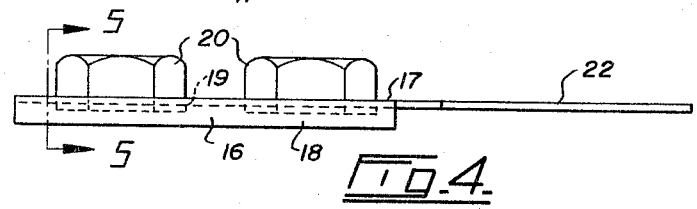
FIGURE 4 is a side elevation thereof.
Figure 5:
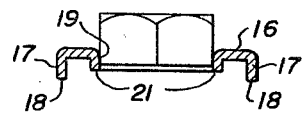
FIGURE 5 is a sectional view along the lines 5—5 of FIGURE 4.
Figure 7:
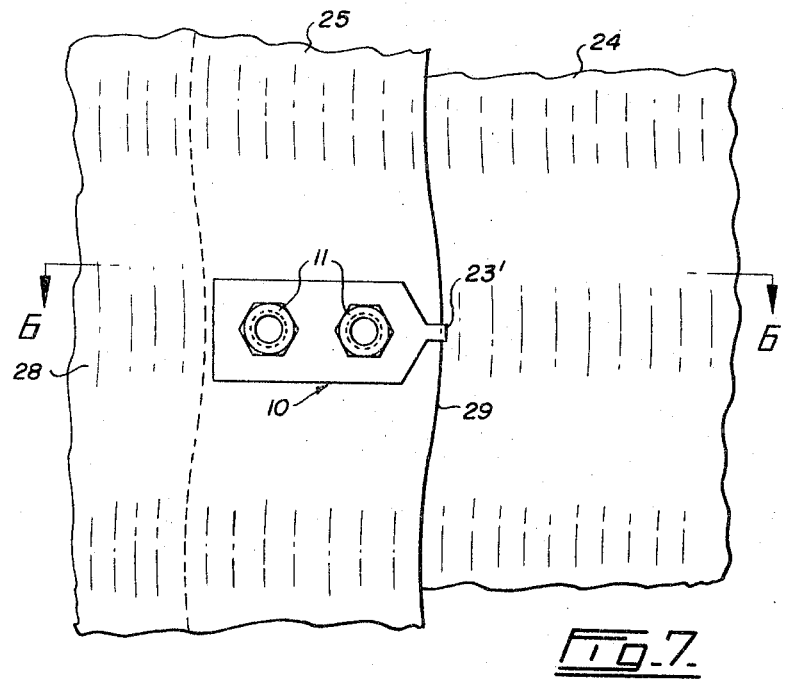
FIGURE 7 is an elevation of FIGURE 6 substantially along the lines 7—7 of FIGURE 6.

FIGURES 3, 4 and 5 show a frame 16 stamped from sheet metal or the like and having a substantially rectangular configuration when viewed in plan. The longitudinal edges 17 of this stamping are downturned substantially at right angles to the plane of the plate and form the downturned edges 18 shown clearly in FIGURE 5.

Apertures 19 are stamped within the plate 16 and nuts 20 are inserted within the apertures which are provided with downturned holding edges 21 so that the nuts are held firmly in position.

Figure 6:
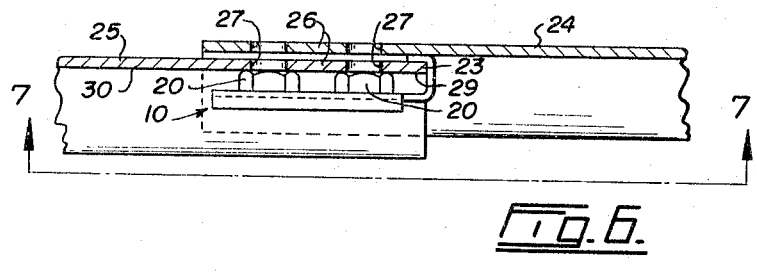
FIGURE 6 is a side sectional elevation, reduced in scale to the other drawings, and showing the device in position upon a liner plate, said section being substantially along the lines 6—6 of FIGURE 7.

Here again an extending strip or tongue 22 is formed as an extension of the plate 16 and both the strips 13 and 22 should be of a malleable material capable of being bent in form of a hook 23' shown in FIGURE 6.

Reference character 24 shows a liner plate made of corrugated steel or the like and nested with this liner plate is a further liner plate 25 to be joined thereto.

The adjoining or overlapping portions 26 of these liner plates are apertured as at 27 within the troughs 28 of the corrugations and the nut holder is then hooked over the edge 29 of the plates 25 so that the nut holder rests against the outer surface 30 of the plate 25 and the nuts 11 or 20 register with the holes 27.

Conventional bolts (not illustrated) are then inserted from the inside of the liner plates, through the apertures, to screw threadably engage the nuts so that the plates may be bolted together.

Both the casting 10 and the stamping 16 are preferably made from an aluminum alloy containing a proportion of magnesium, said alloy being higher in the electromotive force series than the material forming said plates.

This affords cathodic protection and prevents galvanic action occurring between the said nuts, bolts and plates.

In FIGURE 1, I have illustrated an alternative method of attaching the strip 13 to the casting 10.

I provide a pair of apertures 23 clear through the casting and between the nuts 11.

The strip 13 may then underlie the nut on the right hand side of FIGURE 1, pass through the first aperture 23 so that the portion 24 of the strip lies upon the surface of the casting and then passes downwardly through the left hand aperture 23 to be bent over upon the underside as shown in phantom at 25.

Figure 8:
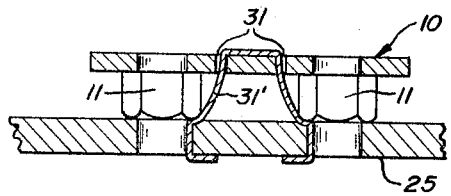
FIGURE 8 is a side sectional elevation of an alternative embodiment of my device.

FIGURE 8 shows another embodiment in which the nuts 11 are engaged with the plate 25 and having the holder 10 on the upper side. A malleable strip 31' is engaged over the holder with the legs passing through the aperture 31 and thence through the bolt apertures in the plate 25 whereupon the ends of the strip are bent inwardly thus holding the assembly in position.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A nut holder for supporting a pair of nuts in spaced relationship with one another upon a pair of nesting liner plates, comprising in combination a nut holding frame, said frame being apertured, the edges of said frame defining said apertures forming apertures the configuration of which is similar to the outer configuration of said nuts being held thereby, means to hold said nuts within said apertures, and means to secure said nut holder to one of said pair of nesting liner plates, said means to secure said nut holder to one of said pair of nesting liner plates including a malleable strip formed on one end of said frame and extending therefrom parallel to the longitudinal axis of said frame, said strip being formed in a hook engageable over the edge of said one liner plate.

2. The device according to claim 1 in which said frame takes the form of a cast block.

3. The device according to claim 1 in which said frame takes the form of a substantially rectangular pressed metal sheet, said sheet having longitudinal edges thereon, said longitudinal edges being downturned at substantially right angles to the plane of said sheet.

4. The device according to claim 1 in which said frame is formed from an alloy higher in the electro-motive force series than said liner plates.

5. The device according to claim 2 in which said frame is formed from an alloy higher in the electro-motive force series than said liner plates.

6. The device according to claim 3 in which said frame is formed from an alloy higher in the electro-motive force series than said liner plates.

References Cited by the Examiner

UNITED STATES PATENTS

| | | | |
|---|---|---|---|
| 1,761,358 | 6/1930 | Mitchell | 151—41.74 |
| 3,052,331 | 9/1962 | Bothwell | 189—36 |

REINALDO P. MACHADO, *Primary Examiner.*

HARRISON R. MOSELEY, *Examiner.*

A. I. BREIER, K. DOWNEY, *Assistant Examiners.*